(12) United States Patent
Kleinmann et al.

(10) Patent No.: US 7,357,751 B2
(45) Date of Patent: Apr. 15, 2008

(54) DRIVE FOR PIVOTING A FLAP ARRANGED ON A BODY OF A VEHICLE ABOUT A PIVOT AXIS

(75) Inventors: Michael Kleinmann, Meisbach (DE); Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 206 days.

(21) Appl. No.: 11/260,348

(22) Filed: Oct. 27, 2005

(65) Prior Publication Data

US 2006/0094562 A1 May 4, 2006

(30) Foreign Application Priority Data

Oct. 28, 2004 (DE) ...................... 10 2004 052 504
Sep. 17, 2005 (DE) ...................... 10 2005 044 579

(51) Int. Cl.
*F16H 3/54* (2006.01)
(52) U.S. Cl. ........................................ 475/317; 475/154
(58) Field of Classification Search ................ 475/179, 475/154, 317; 188/71.9, 72.7
See application file for complete search history.

(56) References Cited

U.S. PATENT DOCUMENTS

| | | | | |
|---|---|---|---|---|
| 2,427,168 A | * | 9/1947 | Thompson et al. | ......... 475/317 |
| 3,921,264 A | * | 11/1975 | Madonian et al. | .......... 475/154 |
| 2004/0159170 A1 | * | 8/2004 | Ritter | ......................... 74/89.22 |
| 2005/0277512 A1 | * | 12/2005 | Gueler et al. | ................ 475/317 |
| 2006/0201758 A1 | * | 9/2006 | Geyer | ......................... 188/72.7 |

FOREIGN PATENT DOCUMENTS

JP          58134252 A    *    8/1983

* cited by examiner

*Primary Examiner*—Sherry Estremsky
(74) *Attorney, Agent, or Firm*—Cohen Pontani Lieberman & Pavane LLP

(57) ABSTRACT

A drive for pivoting a flap on a body of a vehicle about a pivot axis, with a drive motor, by means of which an output driving the flap pivotably can be driven rotatably via a drive train having an epicyclic gear. The epicyclic gear has a sun gear, an internally toothed rim, a planet gear which is in engagement with the sun gear and the internally toothed rim, and a planet carrier which carries the planet gear and which is connected fixedly in terms of rotation to a shaft coaxial with respect to the axis of rotation of the planet carrier. The rotational movement of a component of the epicyclic gear can be braked by a brake. In particular, the brake can stop the rotational movement of the internally toothed rim, the sun gear can be driven rotatably by the drive motor, and the shaft of the planet carrier can form the output.

19 Claims, 3 Drawing Sheets

DRIVE FOR PIVOTING A FLAP ARRANGED ON A BODY OF A VEHICLE ABOUT A PIVOT AXIS

BACKGROUND OF THE INVENTION

Field of the Invention

The invention relates to a drive for pivoting a flap arranged on a body of a vehicle about a pivot axis, with a drive motor, by means of which an output driving the flap pivotably can be driven rotatably via a drive train having an epicyclic gear. The epicyclic gear has a sun wheel, an internally toothed rim, one or more planet wheels which are in engagement with the sun wheel and the internally toothed rim, and a planet carrier which carries the planet wheels and which is connected fixedly in terms of rotation to a shaft coaxial with respect to the axis of rotation of the planet carrier. The epicyclic gear also has a braking device, by means of which the rotational movement of a component of the epicyclic gear can be braked.

Owing to the use of an epicyclic gear, drives of this type are distinguished by a small overall size. At the same time, with the braking device released, the flap can be pivoted by hand, even when the epicyclic gear is driven by a self-locking drive motor, such as, for example, a motor with a worm-wheel stage.

SUMMARY OF THE INVENTION

An object of the invention is to provide a drive of the type mentioned in the introduction, which allows a high transmission ratio and at the same time can be switched by hand between a blocking and a movable state with respect to the movement of the flap.

This object is achieved, according to the invention, in that a component of the epicyclic gear, in particular the internally toothed rim, can be detained by means of the braking device, in that the sun wheel or the planet carrier or the internally toothed rim can be driven rotatably by the drive motor, and in that the shaft of the planet carrier or the sun wheel or the internally toothed rim can form the output.

By virtue of this design, a torque is transmitted with the desired ratio to the output only when a component of the epicyclic gear is detained.

This is implemented by means of the braking device.

If the component of the epicyclic gear is not blocked, the flap can be at least largely freely moved manually on account of the very low resistance of the epicyclic gear, so that a flap movement is possible even when the drive motor is stationary.

The high transmission ratio achievable is particularly advantageous when the pivot axis extends horizontally.

An output gearwheel, by which the flap can be driven pivotably, can be arranged as output on the shaft.

The flap may be driveable pivotably by the shaft via a gear stage which may be designed, so as to save construction space, for example, as a single-stage or multi-stage spur gear.

Preferably, the drive motor is an electric motor, in particular a direct-current motor, which may also be designed as an electric gear motor for optimization.

If an intermediate position of the flap can be held in a self-locking manner by means of the non-driven drive motor, a holding function in an intermediate position of the flap can be implemented, with the drive motor deactivated, by means of the closed braking device.

For braking the component of the epicyclic gear, the braking device can preferably be brought into engagement with a brake disc, the brake disc being connected fixedly to the internally toothed rim or to the shaft or to the sun wheel or being arranged on a structural part capable of being driven rotatably by the internally toothed rim or the shaft or by means of the sun wheel.

If the braking device is arranged on a structural part capable of being driven rotatably by the internally toothed rim, braking with step-up can consequently take place.

If the braking device is a frictional braking device, it may be a band brake or a disc brake or a drum brake, or if the braking device is a non-positive braking device, then a blockage of the internally toothed rim, of the sun wheel or of the planet carrier for the motive flap drive can be achieved in the case of a high braking force of the braking device or manual flap pivoting, with the braking force being overcome, can be achieved in the case of a low braking force and with the motive flap drive switched off, the braking force being dimensioned in order to hold the flap in an intermediate position insofar as the drive motor has sufficient self-locking.

If the braking device is a fixed electromagnetic brake which acts with its magnetic field on the brake disc consisting of a ferromagnetic material, its construction is simple and cost-effective.

The braking device, in particular the electromagnetic brake, may be activatable as a function of an output signal from a movement sensor detecting a movement of the flap, so that, to save energy, only a brief current consumption is required in order to activate the electromagnetic brake.

To optimize the achievable braking force, the magnetic field of the electromagnetic brake may be directed axially with respect to the axis of rotation of the brake disc.

If the brake disc comprises a permanently magnetic material, in the magnetic field of which is arranged a fixed ferromagnetic structural part lying axially opposite with respect to the axis of rotation, then, even with the brake not activated, this brake is closed with a low braking force. The braking force is sufficient to hold the flap in an intermediate position. By manual action upon the flap, however, the latter can be adjusted, with the braking force being overcome.

Depending on the application of current, current can be applied to the coil of the electromagnetic brake so as to be capable of generating a magnetic field attracting and/or repelling the brake disc.

The result of this is that, with the magnetic field attracting the brake disc, the brake is closed with strong coupling to the motive drive of the flap.

With the magnetic field repelling the brake disc, the brake is open and the flap can be freely pivoted manually.

These two states can also be supplemented by a third state in which, with no current being applied to the electromagnetic brake, the flap can be held in an intermediate position, as described above, by means of a brake disc comprising a permanently magnetic material.

The braking force of the frictional or positive or non-positive braking device may be variable.

The braking torque can consequently be set as a function of the flap opening angle and/or the temperature and/or the vehicle inclination.

In this case, a defined braking force can be set by means of an adjustment of an actuating unit of the braking device, and, after adjustment, the braking device can be held automatically in the set position, in which case the actuating unit may have a spindle which can be driven rotatably by an electric motor and which engages into a rotationally fixed nut setting of the braking device, and, with no current being applied to the electric motor, the spindle and nut can be held in their set position.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Exemplary embodiments of the invention are illustrated in the drawing and are described in more detail below. In the drawings.

DETAILED DESCRIPTION OF THE PRESENTLY PREFERRED EMBODIMENTS

Figure 1:
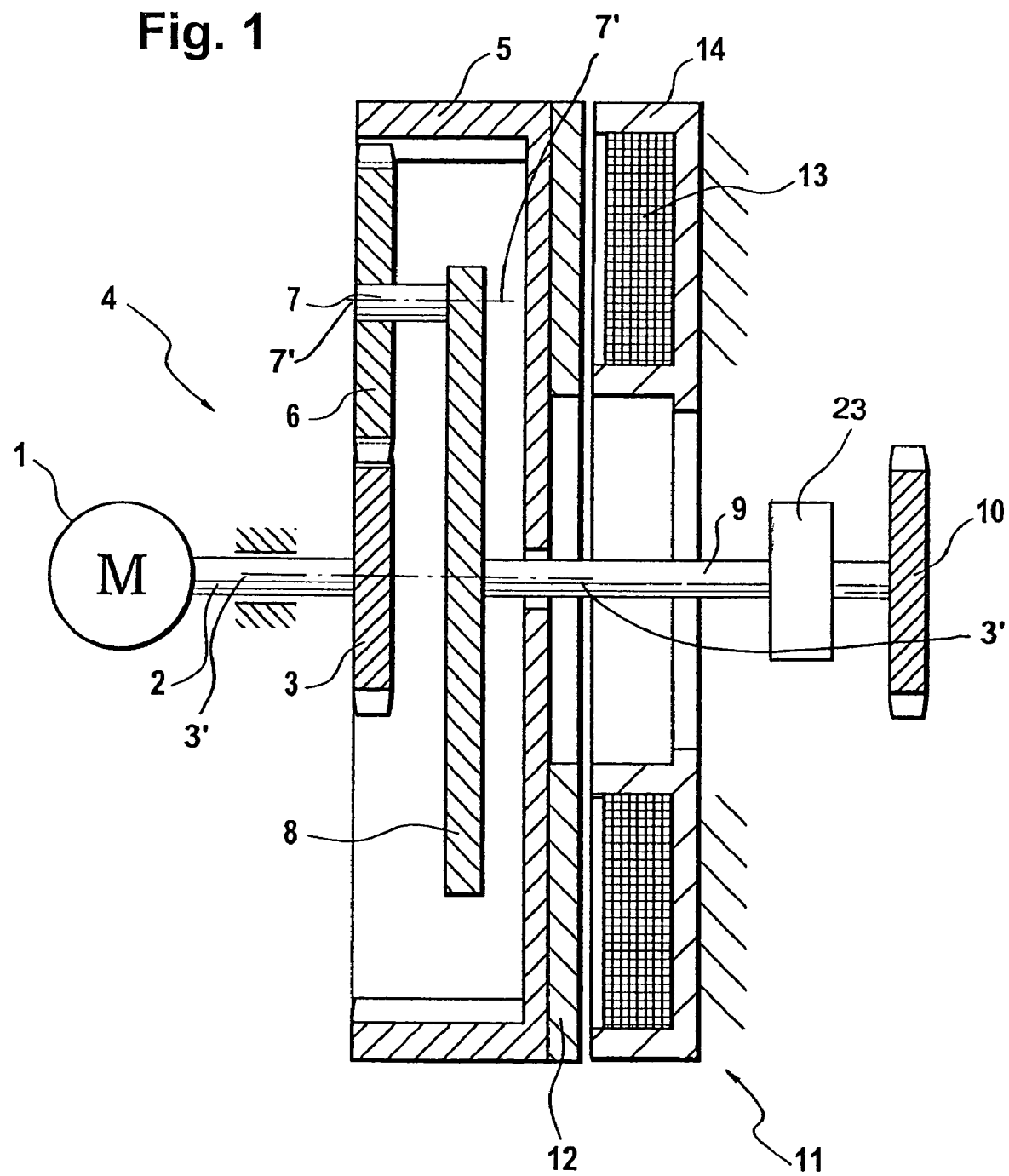
FIG. 1 shows a cross-sectional view of a first exemplary embodiment of a drive.

The drives illustrated in the figures have a self-locking electric motor 1, on the output shaft 2 of which an externally toothed sun wheel or a sun gear 3 of an epicyclic gear 4 is fixedly and concentrically arranged. The sun wheel 3 has a rotation axis 3'-3' and is surrounded concentrically, with a radial clearance, by an internally toothed rim 5 of the epicyclic gear 4.

An externally toothed planet wheel or a planet gear 6 arranged between the sun wheel 3 and the internally toothed rim 5 engages both into the teeth of the sun wheel 3 and into the teeth of the internally toothed rim 5.

The planet wheel 6 has a rotation axis 7'-7' and is mounted rotatably on an axial journal 7 of a planet carrier 8 which is connected fixedly to a shaft 9. The shaft 9 is coaxial with respect to the output shaft 2 of the electric motor 1 (thus the rotation axis of the planet carrier is coaxial with the rotation axis 3'-3' of the sun gear) and carries an output gearwheel 10 for the pivoting drive of a flap, not shown, in particular a rear flap of a vehicle arranged pivotably about a horizontal pivot axis. Further, a gear stage 23 may be mounted on the shaft 9 of the planet carrier 8 for pivoting the flop.

The internally toothed rim 5 can be braked by means of a braking device 11, 11', 11".

In FIG. 1, a brake ring 12 serving as a brake disc and comprising a permanently magnetic material is fixedly arranged coaxially on the internally toothed rim 5.

Located right next to the brake ring 12, concentrically with respect to the latter, is a toroidal coil 13 of the braking device 11 designed as an electromagnetic brake. The braking device 11 can be activated by a movement sensor 24 which is operable to detect a movement of the flap. When a current is applied to the said coil in a first current direction, a magnetic field is generated, which attracts the brake ring 12 onto a ferromagnetic annular housing 14 surrounding the toroidal coil 13, and which blocks a rotational movement of the internally toothed rim 5 by means of frictional connection between the internally toothed rim and the annular housing 14.

When a current is applied in a second current direction which is opposite to the first current direction, a magnetic field is generated which repels the brake ring 12, so that the braking device 11 is uncoupled from the internally toothed rim 5 and consequently the internally toothed rim 5 is freely rotatable.

When no current is applied to the toroidal coil 13, the brake ring 12 is drawn, owing to its permanently magnetic property, into bearing contact against the annular housing 14.

The frictional force present in this case between the brake ring 12 and annular housing 14 can be overcome, however, by manual pivoting action upon the flap and by the rotational movement of the internally toothed rim 5 thereby brought about.

The annular housing 14 is open on its side directed towards the brake ring 12. This braking device 11 possesses a compact construction and is constructed integrally with the drive.

The braking torque can be set as a function of the flap opening angle and/or the temperature and/or the vehicle inclination.

In this case, a defined braking force can be set by means of an adjustment of an actuating unit 25 of the braking device, and, after adjustment, the braking device can be held automatically in the set position, in which case the actuating unit 25 may have a spindle 26 which can be driven rotatably by an electric motor 28 and which engages into a rotationally fixed nut 27 setting of the braking device, and, with no current being applied to the electric motor, the spindle and nut can be held in their set position.

Figure 2:
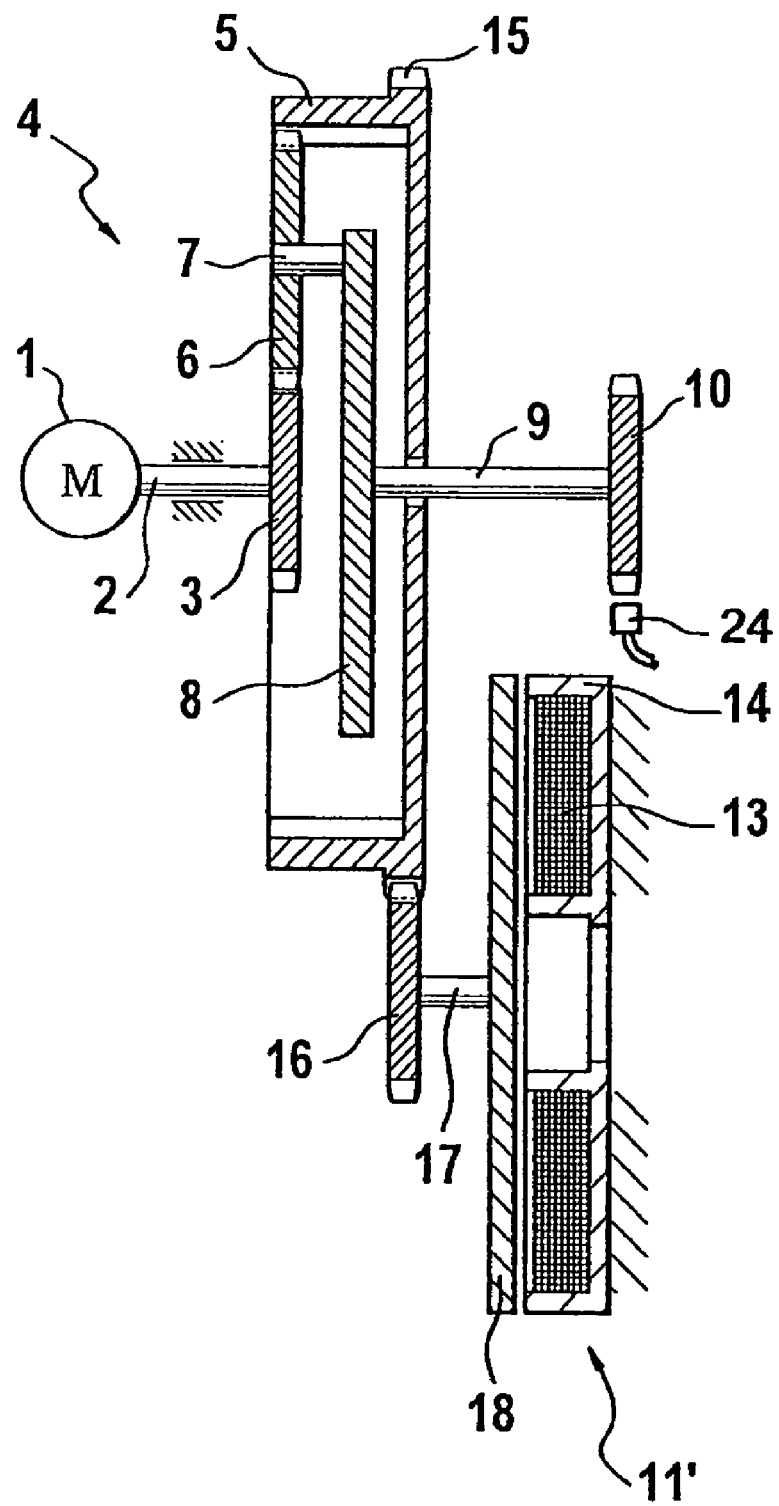
FIG. 2 shows a cross-sectional view of a second exemplary embodiment of a drive.
Figure 3:
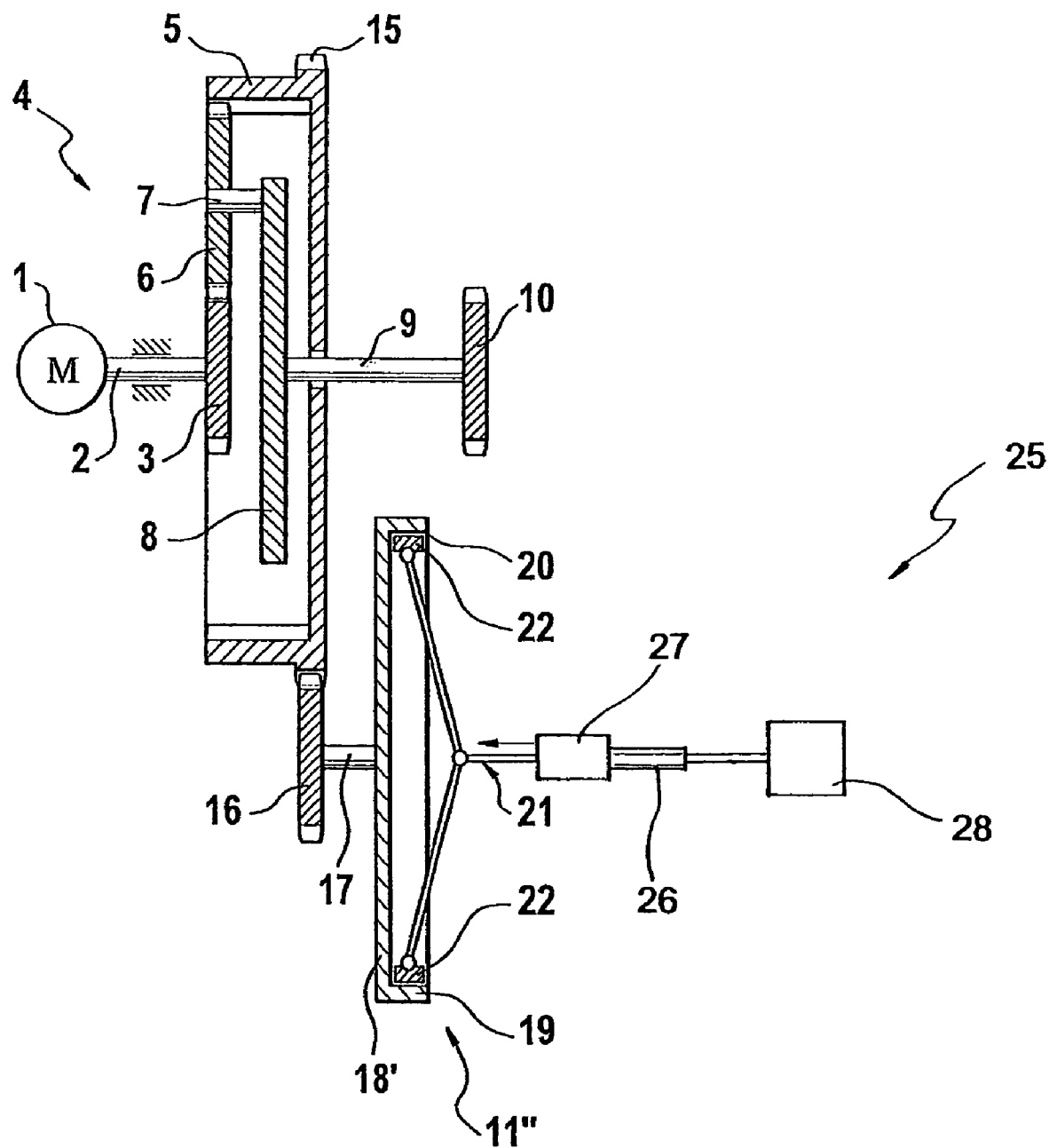
FIG. 3 shows a cross-sectional view of a third exemplary embodiment of a drive.

In the exemplary embodiment of FIGS. 2 and 3, the internally toothed rim 5 possesses, on its radially continuous outer surface area, a toothed ring 15, via which can be driven rotatably a pinion 16, to which is connected fixedly a shaft 17 carrying a brake disc 18, 18'.

In the exemplary embodiment of FIG. 2, the brake disc 18 comprises a ferromagnetic material.

The brake disc 18 has arranged coaxially opposite it, with a slight clearance, a toroidal coil 13 which is arranged, correspondingly to FIG. 1, in a rotationally fixed annular housing 14 and as a result of the application of current to which, correspondingly to the first current direction in FIG. 1, a magnetic field is generated which attracts the brake disc 18 onto the annular housing 14 and blocks the rotational movement of the pinion 16 and consequently also of the internally toothed rim 5 into which the pinion 16 engages.

In the exemplary embodiment of FIG. 3, the brake disc 18' possesses a brake drum 19 which is arranged fixedly on the latter and in the inner region of which are arranged brake shoes 22 capable of being acted upon radially outwards against the inner ring 20 of the brake drum 18 by means of a braking mechanism 21. A rotational movement of the pinion 16 and consequently also of the internally toothed rim 5 can thereby be blocked.

Thus, while there have shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A drive for pivoting a flap on a body of a vehicle about a pivot axis, comprising:
    an epicyclic gear comprising:
        a sun gear connectable to an output shaft of a drive motor;
        an internally toothed rim concentrically surrounding the sun gear;
        at least one planet gear engaging both the sun gear and the internally toothed rim; and
        a planet carrier rotatably carrying the at least one planet gear, the planet carrier having a shaft about which the planet carrier rotates; and
    a brake operable to stop rotation of the internally toothed rim so that torque from the output shaft of the drive motor causes the shaft of the planet carrier to rotate, the brake comprising:
        a brake disc fixedly connected to the internally toothed rim, or fixedly connected to a structural part rotatably driven by the internally toothed rim; and
        a braking means for releasably engaging the brake disc.

2. The drive of claim 1, wherein the pivot axis of the flap extends horizontally.

3. The drive of claim 1, further comprising an output gearwheel mounted on the shaft of the planet carrier for pivoting the flap.

4. The drive of claim 1, further comprising a gear stage mounted on the shaft of the planet carrier for pivoting the flap.

5. The drive of claim 1, further comprising a drive motor having an output shaft coupled to the sun gear.

6. The drive of claim 5, wherein the drive motor is an electric motor.

7. The drive of claim 6, wherein the drive motor is a direct-current motor.

8. The drive of claim 6, wherein the electric motor is an electric gear motor.

9. The drive of claim 5, wherein the drive motor is of a self-locking type.

10. The drive of claim 9, wherein shutting down of the drive motor causes the flap to be maintained in an intermediate position.

11. The drive of claim 1, wherein the brake disc is comprised of ferromagnetic material generating a first magnetic field, and the braking means comprises an electromagnetic means operable to generate a second magnetic field capable of interacting with the first magnetic field.

12. The drive of claim 11, wherein the electromagnetic means is activated by a signal generated by a movement sensor detecting movement of the flap.

13. The drive of claim 11, wherein the magnetic fields are directed axially with respect to a rotation axis of the brake disc.

14. The drive of claim 11, wherein the ferromagnetic material is permanently magnetic.

15. The drive of claim 11, wherein the braking means comprises a coil connectable to a source of current so that upon connection of the coil to the source of current the second magnetic field is generated.

16. The drive of claim 1, further comprising a means for varying a braking force applied by the brake.

17. The drive of claim 16, further comprising an actuating unit for setting a selected braking force.

18. The drive of claim 17, wherein the actuating unit has a spindle operable to be driven rotatably by a motor, the actuating unit engaging a rotationally fixed nut to set the brake, wherein at least one of the spindle and nut can be held in a set position when no current is applied to the motor.

19. The drive of claim 1, wherein the brake disc comprises a brake ring concentrically attached to the internally toothed rim.

* * * * *